Aug. 3, 1954 M. MENNESSON 2,685,197
HARDNESS MEASURING APPARATUS
Filed March 13, 1952 2 Sheets-Sheet 1

INVENTOR
MARCEL MENNESSON
BY
ATTORNEYS

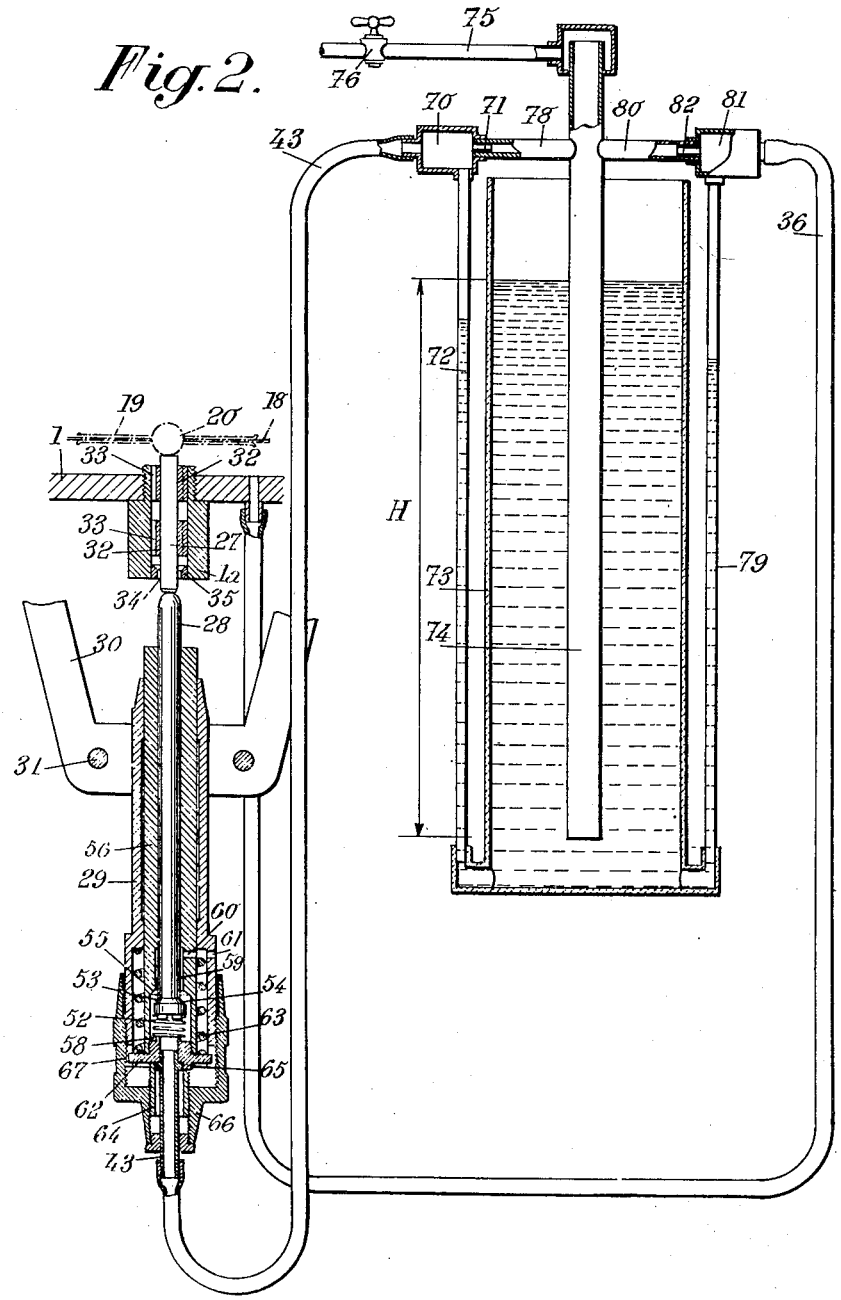

Patented Aug. 3, 1954

2,685,197

UNITED STATES PATENT OFFICE 2,685,197

HARDNESS MEASURING APPARATUS

Marcel Mennesson, Neuilly-sur-Seine, France, assignor to Societe d'Applications et de Constructions pour Materiel Automobile (S. A. C. M. A.), Neuilly-sur-Seine, France, a society of France Application March 13, 1952, Serial No. 276,317

Claims priority, application France March 17, 1951

7 Claims. (Cl. 73—81)

The present invention relates to apparatus for measuring the hardness of a material by means of a ball or cone which is applied with a predetermined pressure against the piece under test so that the section of the indentation left by the ball or the depth of that formed by the cone gives an indication concerning the hardness of the material of said piece.

The existing apparatus of this kind have several drawbacks among which may be cited the lack of uniformity of the pressure with which the ball or cone is applied against the material and the lack of precision of the measurement of the area or depth of the indentation. The size of this indentation may be such that the piece after testing is no longer fit to be used or at least has an unpleasant appearance. Furthermore, these apparatus are relatively slow to use, which is a serious inconvenience when series of measurements are to be made.

The object of the present invention is to provide a hardness measuring apparatus which obviates these drawbacks.

For this purpose, according to my invention, the part (ball, cone or the like) which is applied against the piece to be tested for measuring its hardness is actuated by a diaphragm operated by a fluid under constant pressure, for instance obtained through the means which supply a constant fluid pressure to a pneumatic measurement device serving to measure the amount by which the abovementioned piece is driven into the piece.

Other features of my invention will become apparent in the course of the following detailed description of a specific embodiment thereof with reference to the accompanying drawings, given merely by way of example, and in which:

Fig. 2 shows in section on an enlarged scale a portion of this instrument.

Figure 1:
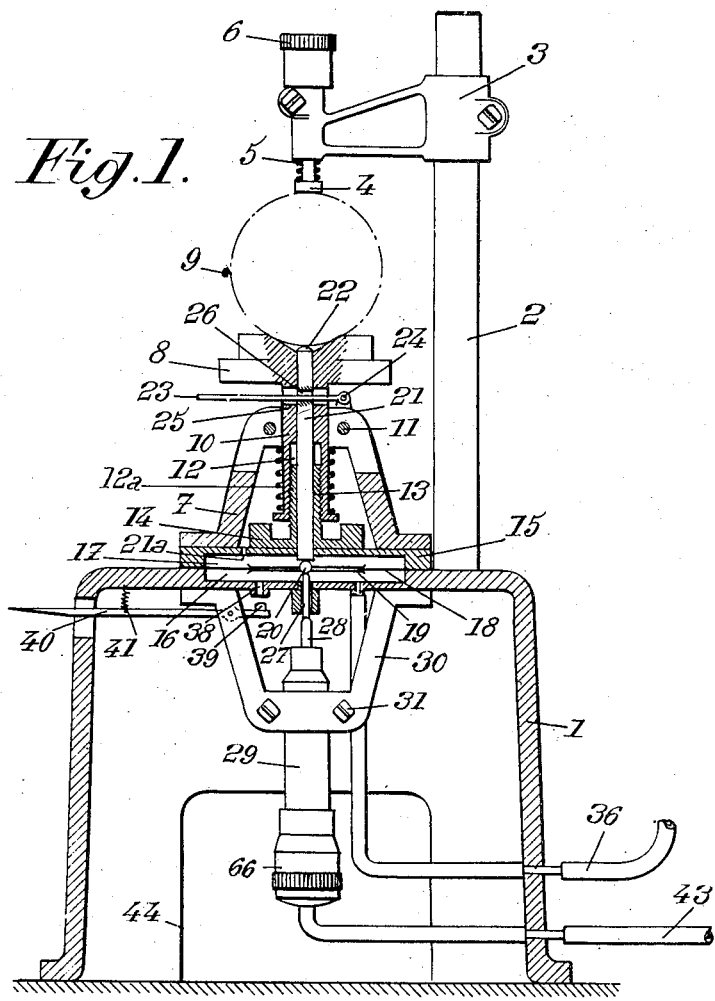
Fig. 1 is an elevational view, partly in vertical section, of a measurement instrument according to my invention.

In the embodiment of my invention shown by the drawing, the hardness measurement instrument is mounted on a frame 1 supporting a column 2 which carries an arm 3 adjustable along said column. The free end of this arm 3 is fitted with a push-piece 4 slidable vertically with respect to said arm and urged in the downward direction by a spring 5. A milled knob 6 rigid with this push-piece makes it possible to pull it upwardly against the action of this spring.

Frame 1 carries a horizontal hollow disc 15 and, above this disc, a holder 7 the top portion of which is forked so as to keep in position between its two branches the tail portion 10 of a support 8 for the piece 9 the hardness of which is to be measured. This piece 9 is kept applied against support 8 by push-piece 4.

The position of tail portion 10 between the branches of holder 7 can be adjusted upwardly or downwardly when these branches are not applied against portion 10. Once tail portion 10 has been given the desired position, said branches are pulled toward each other by means of locking screws and tail portion 10 is then fixed in this position. The lower end of tail portion 10 is provided with a cylindrical recess 12 in which is screwed the vertical extension 13 of a disc 14 resting upon a disc 15. Tail portion 10 is shaped so that it cannot turn in holder 7 but can only slide vertically with respect thereto. Therefore, when disc 14 is rotated, together with its extension 13, tail portion 10 and support 8 are moved upwardly or downwardly for vertical adjustment with respect to holder 7, provided of course that the locking screws 11 have been loosened. A spring 12a interposed between holder 7 and a flange carried by the lower end of tail portion 10 urges piece 8—10 downwardly.

The under face of disc 15 and the top face of frame 1 are provided with circular coaxial recesses 17 and 16 respectively, located opposite each other. A circular diaphragm 18, the edge of which is caught between parts 1 and 15, forms a partition between the chambers formed by these recesses. The central portion of this diaphragm is held between two discs 19 rigid with each other and carrying, at the center thereof, a ball 20 rigid therewith. Chamber 17 communicates with the atmosphere through a hole 21a provided in disc 15.

A rod 21 the top of which carries a conical diamond end 22 intended to be applied against piece 9 is slidable axially in support 8, its tail portion 10, disc 14, its vertical extension 13 and disc 15, and the lower end of this rod 21 rests upon ball 20.

The pointed top end 22 of rod 21 projects normally from the bottom of the V-shaped recess provided in the top face of support 8, so that said end 22 can bear against the surface of the piece 9 to be tested. But said end 22 can be retracted by means of a lever 23 pivoted at 24 to holder 7 and passing with a substantial play through a hole 25 provided in tail portion and with a smaller play through a hole 26 provided in rod 21.

Ball 20 bears upon a rod 27 slidable (Fig. 2) in two guiding parts 32 carried by a sleeve 1a rigid with frame 1. These guiding parts 32 are provided with longitudinal passages 33. The lower part of rod 27 passes with a substantial clearance shown at 34 inside a ring 35 rigid with sleeve 1a. This interval 34 is accurately calibrated. The air present in chamber 16 can thus escape to the atmosphere through passages 33 and interval 34.

Rod 27 rests upon a rod 28 belonging to a pneumatic measurement apparatus.

This apparatus includes a body 29 mounted in fixed position with respect to frame 1 by means of a holder 30 provided with tightening screws 31. In this fixed body 29 there is mounted a sleeve 56. Sleeve 56 is held in fixed position with respect to body 29 but this fixed position can be adjusted in the axial direction before a series of measurements as follows.

Sleeve 56 carries, screwed in fixed position to its lower end, a part 62 forming a flange with respect to said sleeve and which bears upon a tubular piece 64 which cannot turn with respect to flange 62 owing to the provision on said flange of a lug 65 engaged in a corresponding notch of piece 64. Part 62 is prevented from rotating with respect to body 29 by lugs 67 rigid with said part and engaging longitudinal grooves provided in said body. A powerful spring 63 interposed between body 29 and flange 62 urges the whole of sleeve 56, flange 62 and piece 64 downwardly with respect to body 29. On the other hand, a cylindrical cap 66 is provided with two sets of screw threads, of different pitches cooperating respectively with a set of screw threads formed in the outer wall of body 29 and a set of screw threads formed in the outer wall of cylindrical piece 64. Thus, owing to the differential action of these two sets of screw threads, cap 66 makes it possible to adjust the position of sleeve 56 with respect to body 29.

Rod 28 is guided vertically in sleeve 56. The lower end of sleeve 56 is provided with a cylindrical recess of a diameter substantially larger than that of rod 28 with which it is coaxial, so as to form a chamber 58 in which moves with a very substantial clearance a valve 53 integral with rod 28. The top of chamber 58 forms a seat 55 for this valve 53. Valve 53 is urged toward its seat by a spring 52. Chamber 58 is closed at the bottom by the part 62 forming the flange above referred to. A conduit 43 connected with a source of gas under pressure extends through this part 62, in which it is screwed.

The gas under pressure fed through conduit 43 thus enters chamber 58, passes between valve 53 and its seat 55 (where it undergoes a pressure drop of a value depending upon the distance between said valve and said seat) then through annular space 59, and flows out to the atmosphere through holes 60 and 61.

Since valve seat 55 is carried by a piece 56 normally fixed with respect to frame 1, whereas valve 53 belongs to a rod 28 which is applied by its return spring 52 against a rod 27 bearing against ball 20 upon which rod 21 is resting, it is clear that the above mentioned pressure drop (between valve 53 and its seat 55) is determined by the position of rod 21 with respect to frame 1. When rod 21 is moved (by the driving of its pointed end 22 into the piece 9 to be tested) the value of this displacement can be determined by measuring the corresponding variation of this pressure drop. This is done by means of the pressure feed and gauge device shown on the right hand side of Fig. 2.

This device includes a vertical vessel 73, containing water in which is immersed a vertical tube 74 fed with a gas under pressure, for instance air from a pipe 75 connected with a source of compressed air (with a cock 76 for stopping the feed). The pressure in tube 74 is proportional to the height of water in which this tube is immersed and it is therefore constant provided that this height of water is constant. A conduit 78 leads from tube 74 into a chamber 70 through a calibrated nozzle 71. The other end of chamber 70 is in communication with conduit 43. The pressure in chamber 70 is measured by a pressure gauge 72.

Thus, for every variation of the pressure drop past the interval between valve 53 and its seat 55, the pressure in chamber 70 undergoes the same variation, which is measured by pressure gauge 72.

In the embodiment of my invention which is being described, tube 74 also constitutes the source of constant fluid pressure fed to chamber 16 to act on diaphragm 18 so as to drive the end 22 of rod 21 into the piece to be tested. It should however be well understood that, according to my invention, this source of constant fluid pressure may be a distinct and separate one. As a matter of fact, the device for measuring the local deformation of piece 9 produced by the driving of rod 21 into its periphery is not necessarily a pneumatic device and, if it is not, the source of constant fluid pressure for operating diaphragm 18 is necessarily independent of the deformation measuring device.

In the example shown, tube 74 communicates through a conduit 80 provided with a calibrated nozzle 82 with a chamber 81 the other end of which is in communication with a conduit 36 leading to chamber 16. The pressure in chamber 81 is measured by a pressure gauge 79.

The gas under pressure supplied through conduit 36 to chamber 16 can escape therefrom through two different ways: First through passages 33 and 34, of relatively small section, and secondly through a hole 38, of larger section, which can be stopped by a plug 39 carried by an operating lever 40 pivoted to holder 30 and urged by a spring 41 toward the position which leaves hole 38 open.

A hole 44 in frame 1 makes it possible to adjust the pneumatic measurement device by rotation of cap 66.

The apparatus above described works in the following manner:

In order to place the piece 9 to be tested in position, rod 21 is moved downwardly by means of lever 23 and push-piece 4 is pulled up. Once piece 9 has been placed in the V-shaped groove provided in the top face of support 8, push-piece 4 is released, thus keeping piece 9 in position, and lever 23 is released.

Hole 38 is normally open.

The height of support 8 is adjusted by means of disc 14 so that the diamond end 22 of rod 21 is just in contact with piece 9. The pneumatic measurement device is then adjusted, by means of cap 66, so that the indication of pressure gauge 72 has a suitable value, for instance zero, on the scale of this gauge.

The force with which diamond end 22 is applied against piece 9 is determined by the pressure in chamber 16 and by a small pressure exerted by the pneumatic measurement device through its rod 28 (and due in particular to the action of spring 52). But this action of the pneumatic measurement device is very small as compared to that of the pressure of chamber 16 transmitted by diaphragm 18 and, anyway, it is practically constant.

The pressure in chamber 16 depends upon the pressure in tube 74, which is rigorously constant since it corresponds to the height of a column of water of a height H, and the dimensions of holes 34 and 38.

Hole 38 is then stopped by means of lever 40. The pressure then rises in chamber since gas can now escape therefrom only through interval 34. Diaphragm 18 pushes rod 21 upwardly, thus driving the diamond end 22 thereof into piece 9. Simultaneously, the rod 28 of the pneumatic measurement device moves together with rod 21, bringing its valve 53 closer to valve seat 54. The increase of pressure drop undergone by the gas stream flowing from conduit 43 and chamber 58 past the annular interval between these two parts 53 and 54 to the atmosphere through holes 60 and 61 is indicated by pressure gauge 72 and the scale of this gauge may bear graduations giving directly either the displacement of rod 21 or even the hardness of piece 9.

Once the liquid column of pressure gauge 72 has sufficiently stabilized to permit a correct reading of its indication, hole 38 is again opened by means of lever 40 so that the initial pressure conditions are restored in chamber 16.

Pressure gauge 79 makes it possible to check that the pressure in chamber 16 is always given the desired fixed value to operate diaphragm 18.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. An apparatus for measuring the hardness of a piece which comprises, in combination, an indenting member, a diaphragm mounted for driving said indenting member into the surface of said piece, means for applying to said diaphragm a compressed air pressure to actuate it to drive said indenting member, means forming a compressed air circuit having a variable cross section outlet to the atmosphere, means operatively connected with said diaphragm for varying said outlet cross section in response to displacements of said diaphragm, gauge means in communication with said outlet for measuring the pressure in said air circuit; and a common source of air under constant pressure connected with both said compressed air circuit and said means for applying a compressed air pressure to said diaphragm for feeding said two last mentioned means with compressed air at the same pressure.

2. An apparatus for measuring the hardness of a piece which comprises, in combination, a frame, a support for said piece carried by said frame, an indenting member movably guided with respect to said frame to be driven into said piece, means forming a hollow chamber carried by said frame, a diaphragm forming one wall of said chamber, said diaphragm being operatively connected with said indenting member to drive it into said piece in response to a rise of pressure in said chamber, means forming a compressed air circuit having a variable cross section outlet to the atmosphere, means operatively connected with said diaphragm for varying said outlet cross section in response to displacements of said diaphragm, gauge means in communication with said outlet for measuring the pressure in said air circuit, and a common source of air under constant pressure connected with both said compressed air circuit and said chamber for feeding said circuit and said chamber with compressed air at the same pressure.

3. An apparatus for measuring the hardness of a piece which comprises, in combination, a frame, a support for said piece carried by said frame, an indenting member movably guided with respect to said frame to be driven into said piece, means forming a hollow chamber carried by said frame, a diaphragm forming one wall of said chamber, said diaphragm being operatively connected with said indenting member to drive it into said piece in response to a rise of pressure in said chamber, means forming a compressed air circuit having a variable cross section outlet to the atmosphere, means operatively connected with said diaphragm for varying said outlet cross section in response to displacements of said diaphragm, gauge means in communication with said outlet for measuring the pressure in said air circuit, and a common source of air under constant pressure connected with both said compressed air circuit and said chamber for feeding said circuit and said chamber with compressed air at the same pressure, said chamber being provided with outlet means, and means mounted on said frame for controlling said outlet means.

4. An apparatus for measuring the hardness of a piece which comprises, in combination, a frame, a support for said piece carried by said frame, an indenting member movably guided with respect to said frame to be driven into said piece, means forming a hollow chamber carried by said frame, a diaphragm forming one wall of said chamber, said diaphragm being operatively connected with said indenting member to drive it into said piece in response to a rise of pressure in said chamber, means forming a compressed air circuit having a variable cross section outlet to the atmosphere, means operatively connected with said diaphragm for varying said outlet cross section in response to displacements of said diaphragm, gauge means in communication with said outlet for measuring the pressure in said air circuit, and a common source of air under constant pressure connected with both said compressed air circuit and said chamber for feeding said circuit and said chamber with compressed air at the same pressure, said chamber being provided with at least two outlet holes, one of relatively small section constantly open, and the other of larger section, and means mounted on said frame for stopping at will said second mentioned hole.

5. An apparatus for measuring the hardness of a piece which comprises, in combination, a frame, a support for said piece carried by said frame, an indenting rod movably guided with respect to said frame to have one of its ends applied against said piece, a diaphragm, substantially at right angles to said rod, carried by said frame and having its central part in contact with the other end of said indenting rod, means carried by said frame forming on the other side of said diaphragm from said indenting rod a hollow chamber one wall of which is constituted by said diaphragm, means carried by said frame forming a compressed air circuit having a variable cross section outlet to the atmosphere, a rod in line with said indenting rod slidable in the wall of said chamber opposed to said diaphragm and bearing against said diaphragm on the other side thereof from said indenting rod, means for urging said second mentioned rod toward said diaphragm, means carried by said second mentioned rod for varying the cross section of said outlet in response to longitudinal displacements of said second mentioned rod, gauge means in communication with said outlet for measuring the pressure in said air circuit, means for raising the pressure in said chamber, and means for feeding air at a predetermined constant pressure to said air circuit.

6. An apparatus for measuring the hardness of a piece which comprises, in combination, a frame, a support for said piece carried by said frame, an indenting rod movably guided with respect to said frame to have one of its ends applied against said piece, a diaphragm, substantially at right angles to said rod, carried by said frame and having its central part in contact with the other end of said indenting rod, means carried by said frame forming on the other side of said diaphragm from said indenting rod a hollow chamber one wall of which is constituted by said diaphragm, means carried by said frame forming a compressed air circuit having a variable cross section outlet to the atmosphere, a rod in line with said indenting rod slidable in the wall of said chamber opposed to said diaphragm and bearing against said diaphragm on the other side thereof from said indenting rod, with a small clearance between said second mentioned rod and said wall whereby fluid under pressure in said chamber can leak out past said rod into the atmosphere, said chamber being further provided with a hole of a cross section substantially greater than that of said clearance opening into the atmosphere, means for urging said second mentioned rod toward said diaphragm, means carried by said second mentioned rod for varying the cross section of said air circuit outlet in response to longitudinal displacements of said second mentioned rod, gauge means in communication with said air circuit outlet for measuring the pressure in said air circuit, means for feeding a gaseous fluid under pressure to said chamber, means mounted on said frame for closing said hole to raise the pressure in said chamber, and means for feeding air at a predetermined constant pressure to said air circuit.

7. An apparatus for measuring the hardness of a piece which comprises, in combination, a frame, a support for said piece carried by said frame, an indenting rod movably guided with respect to said frame to have one of its ends applied against said piece, a diaphragm, substantially at right angles to said rod, carried by said frame and having its central part in contact with the other end of said indenting rod, means carried by said frame forming on the other side of said diaphragm from said indenting rod a hollow chamber one wall of which is constituted by said diaphragm, means carried by said frame forming a compressed air circuit having a variable cross section outlet to the atmosphere, a rod in line with said indenting rod slidable in the wall of said chamber opposed to said diaphragm and bearing against said diaphragm on the other side thereof from said indenting rod, with a small clearance between said second mentioned rod and said wall whereby fluid under pressure in said chamber can leak out past said rod into the atmosphere, said chamber being further provided with a hole of a cross section substantially greater than that of said clearance opening into the atmosphere, means for urging said second mentioned rod toward said diaphragm, means carried by said second mentioned rod for varying the cross section of said air circuit outlet in response to longitudinal displacements of said second mentioned rod, gauge means in communication with said air circuit outlet for measuring the pressure in said air circuit, means mounted on said frame for closing said hole to raise the pressure in said chamber, and a common source of air under constant pressure connected with both said compressed air circuit and said chamber for feeding said circuit and said chamber with compressed air at the same pressure.

References Cited in the file of this patent

UNITED STATES PATENTS

| Number | Name | Date |
| --- | --- | --- |
| 1,320,748 | Fisher | Nov. 4, 1919 |
| 2,359,236 | Moore | Sept. 26, 1944 |
| 2,498,136 | Rupley | Feb. 21, 1950 |

FOREIGN PATENTS

| Number | Country | Date |
| --- | --- | --- |
| 771,662 | France | July 30, 1934 |